United States Patent
Miya (10) Patent No.: US 7,020,445 B1
(45) Date of Patent: Mar. 28, 2006

(54) WIRELESS BASE STATION SYSTEM, AND WIRELESS TRANSMISSION METHOD

(75) Inventor: Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 749 days.

(21) Appl. No.: 09/857,328

(22) PCT Filed: Oct. 3, 2000

(86) PCT No.: PCT/JP00/06849

§ 371 (c)(1),
(2), (4) Date: Jun. 4, 2001

(87) PCT Pub. No.: WO01/28129

PCT Pub. Date: Apr. 19, 2001

(30) Foreign Application Priority Data

Oct. 8, 1999 (JP) ................................. 11-287896

(51) Int. Cl.
*H03C 7/02* (2006.01)
(52) U.S. Cl. ..................... 455/101; 455/69; 455/562.1; 455/522
(58) Field of Classification Search ............. 455/562.1, 455/64, 522
See application file for complete search history.

(56) References Cited

U.S. PATENT DOCUMENTS

| | | | | |
|---|---|---|---|---|
| 6,141,567 A | * | 10/2000 | Youssefmir et al. | 455/562.1 |
| 6,192,256 B1 | * | 2/2001 | Whinnett | 455/562.1 |
| 6,434,366 B1 | * | 8/2002 | Harrison et al. | 455/69 |
| 6,463,295 B1 | * | 10/2002 | Yun | 455/522 |
| 6,522,898 B1 | * | 2/2003 | Kohno et al. | 455/562.1 |
| 6,690,952 B1 | * | 2/2004 | Nishimori et al. | 455/562.1 |
| 6,694,155 B1 | * | 2/2004 | Chin et al. | 455/562.1 |
| 6,735,182 B1 | * | 5/2004 | Nishimori et al. | 370/294 |
| 6,740,192 B1 | * | 5/2004 | Lu et al. | 156/330 |

FOREIGN PATENT DOCUMENTS

| | | |
|---|---|---|
| EP | 0755090 | 1/1997 |
| EP | 0755094 | 1/1997 |
| EP | 0917240 | 5/1999 |
| EP | 1014599 A1 | 6/2000 |
| GB | 2313261 A | 11/1997 |
| GB | 2335572 A | 9/1999 |
| JP | 4150113 | 5/1992 |
| JP | 8274687 | 10/1996 |
| JP | 9260939 | 10/1997 |

(Continued)

OTHER PUBLICATIONS

PCT International Search Report dated Dec. 26, 2000.

(Continued)

*Primary Examiner*—Ahmad F. Matar
*Assistant Examiner*—Marie C. Ubiles
(74) *Attorney, Agent, or Firm*—Stevens, Davis, Miller & Mosher, LLP (57) ABSTRACT

A radio base station apparatus may include two diversity antennas spaced apart by a distance that allows space diversity, with each diversity antenna functioning as an adaptive array antenna. Each diversity antenna has a corresponding transmitter that includes a calculator that calculates a transmission weight from one of (i) a reception weight determined based on an uplink signal and (ii) direction of arrival information. Each transmitter also has a multiplier that multiplies only a transmission signal for a channel to a specific user by the transmission weight. Also, each transmitter has a transmit power controller that controls the transmit power of the transmission signal, multiplied by the transmission weight, in accordance with a transmit power control signal.

7 Claims, 4 Drawing Sheets

FOREIGN PATENT DOCUMENTS

| | | |
|---|---|---|
| JP | 9326630 | 12/1997 |
| JP | 10117162 | 5/1998 |
| JP | 11164381 | 6/1999 |
| JP | 11266228 | 9/1999 |
| JP | 200022611 | 1/2000 |
| JP | 2000106539 | 4/2000 |

OTHER PUBLICATIONS

T. Ohgane, "Spectral efficiency improvement by base station antenna pattern control for land mobile cellular systems", Technical Report of IEICE, MW 93-25. RCS93-8 (May 1993) pp. 55-60 with English Abstract.

T. Ohgane, "Spectral efficiency improvement by base station antenna pattern control for land mobile cellualar systems"; IEICE Trans. Commun., vol. E77-B, No. 5 (May 1994) pp. 598-605 with English Abstract.

"Design Analysis Method Workshop in Antenna Propagation (No. 10)—Adaptive Signal Processing Technique by Aray Antenna and High-Resolution Direction of Arrival Estimation introduction Course-Oct. 30, 1997," pp. 61-77.

Supplementary European Search Report dated May 31, 2005.

I. Chiba, et al., "Transmitting Null Beam Forming with Beam Space Adaptive Array Antennas," Vehicular Technology Conference, XP010123328, IEEE, 44th Stockholm, Sweden, pp. 1498-1502, Jun. 8, 1994.

* cited by examiner

WIRELESS BASE STATION SYSTEM, AND WIRELESS TRANSMISSION METHOD

TECHNICAL FIELD

The present invention relates to a radio base station apparatus and radio transmission method in a digital radio communication system, and more particularly to a radio base station apparatus and radio transmission method in a DS-CDMA (Direct Sequence-Code Division Multiple Access) system.

BACKGROUND ART

In a mobile communication, the quality of a received signal deteriorates extremely due to fading. One of effective methods for overcoming the fading is a diversity technique. The diversity technique usually uses a plurality of received signals to achieve transmission of high communication quality. For example, when a receiver has two antennas spaced adequately apart from each other, the fading variation on the antenna is independent of each other. Accordingly, provability decreases that the power of signals received by the two antennas decreases at the same time. The diversity technique uses such a principle to prevent the power of a received signal from falling down on a receiver side.

There are, however, various restrictions to achieve the diversity in a communication terminal apparatus such as a mobile station. Therefore, in order to achieve the diversity, which should be achieved originally on a receiver side in the mobile station, on a transmitter side of a base station, a transmit diversity technique has been investigated.

Figure 1:
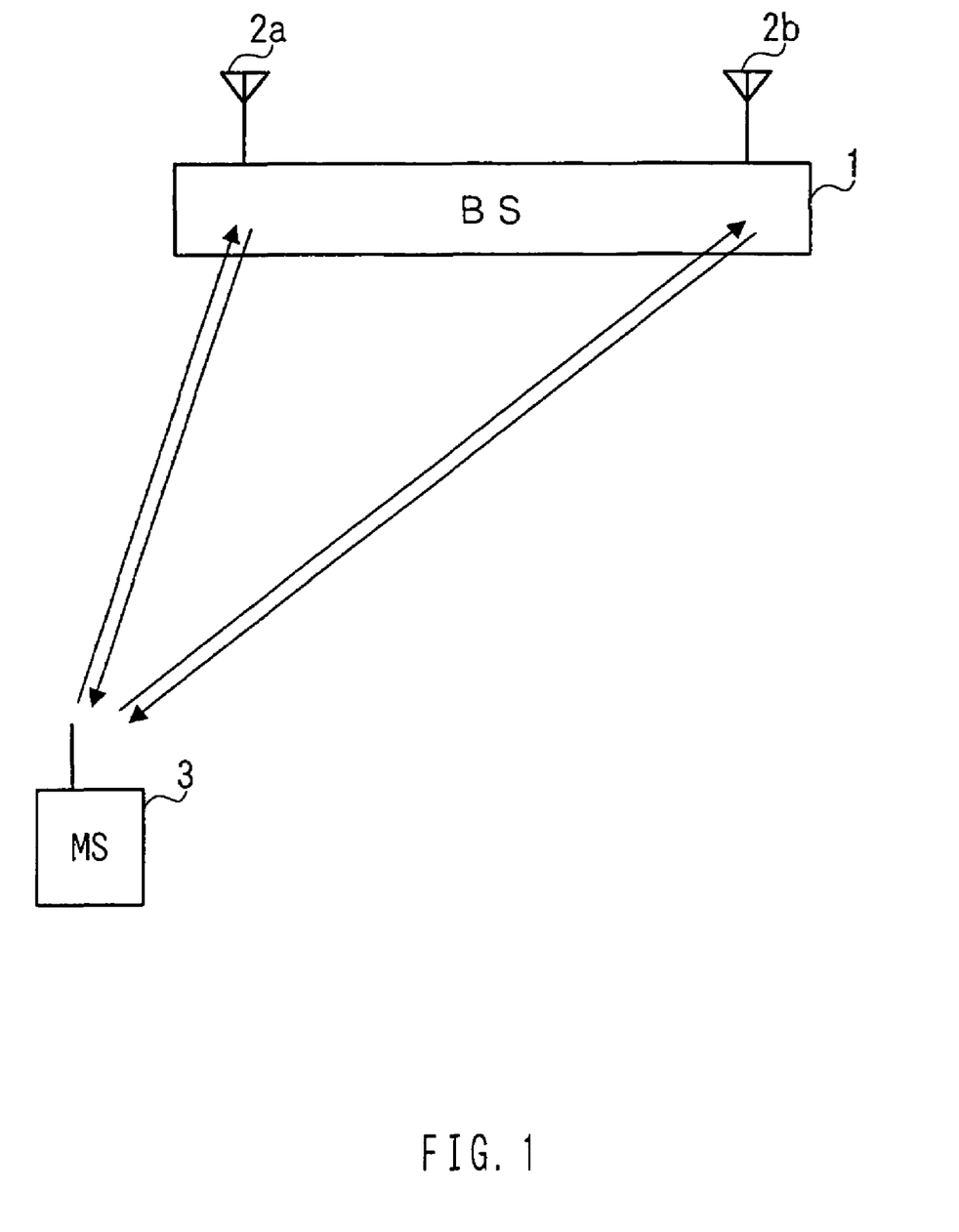
FIG. 1 is a conceptual diagram to explain transmit diversity.

In the transmit diversity, as illustrated in FIG. 1, base station 1 transmits signals with the same phase to mobile station 3 using antennas 2a and 2b, and mobile station 3 selects a received signal transmitted from one of the antennas with a power level larger than that of the other signal. Due to the transmit diversity, it is possible to suppress the effect of fading, and to improve the communication quality.

In the transmit diversity, it is thus possible to suppress the effect of fading, and to improve the communication quality, however, it is not possible to provide interfering suppressing effect that is an effect for suppressing the interference in other stations. Particularly in a CDMA system, suppressing interference in other stations enables each station to perform efficient communications, further enables the system capacity to be increased. Therefore, the interfering suppressing effect becomes important.

DISCLOSURE OF INVENTION

It is an object of the present invention to provide a radio base station apparatus and radio transmission method capable of suppressing the effect of fading to improve the communication quality, providing the interfering suppressing effect to other stations, and reducing transmission power per mobile station.

The inventors of the present invention paid attention to a transmission adaptive array antenna (smart antenna) technique for providing the interfering suppressing effect, and achieved a radio base station apparatus and radio transmission method for providing both the fading suppressing effect and interfering suppressing effect, by combining the transmit diversity and transmission adaptive array antenna technique only on a communication channel (including packets) and a control channel for a specific user (FACH (Forward Access Channel) and AICH (Acquisition Indication CHannel)) to which the transmission adaptive array antenna technique is applicable.

Figure 2:
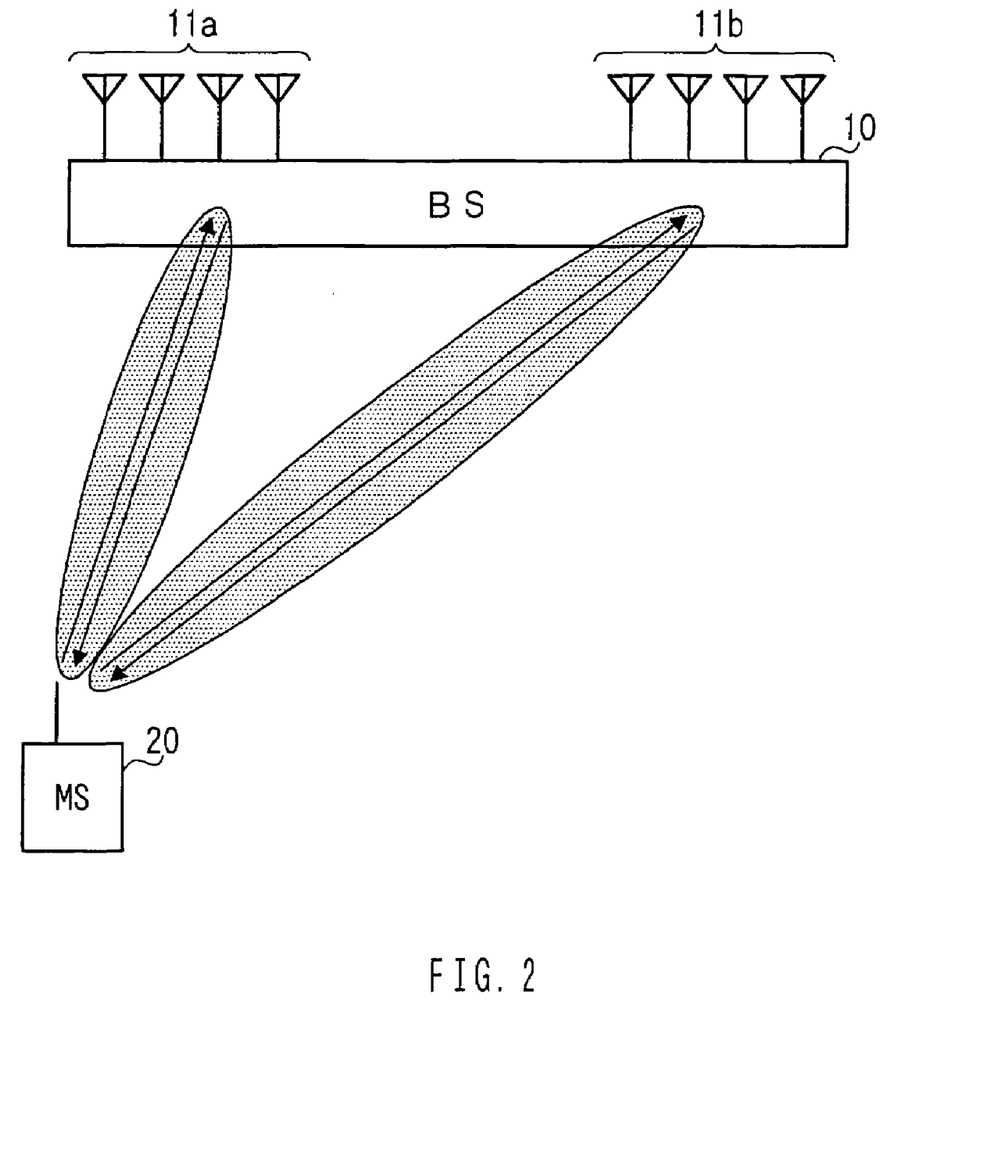
FIG. 2 is a conceptual diagram to explain a radio transmission method of the present invention.

It is a gist of the present invention that, as illustrated in FIG. 2, radio base station apparatus 10 performs the transmit diversity using diversity antennas 11a and 11b, while further performing the transmission adaptive array antenna control, for communication terminal apparatus 20.

BEST MODE FOR CARRYING OUT THE INVENTION

Embodiments of the present invention will be described specifically below with reference to accompanying drawings.

First Embodiment

As transmit diversity schemes, there are two schemes, namely, closed-loop mode transmit diversity and open-loop mode diversity. This embodiment describes a case of the closed-loop mode type of transmit diversity. The present invention is capable of being applied to both an FDD (Frequency Division Duplex) system and TDD (Time Division Duplex) system. The case of the FDD system will be described here. Further, a case will be described that a radio transmission method of the present invention is applied only to a communication channel (including packets) and a control channel for a specific user (FACH and AICH).

Figure 3:
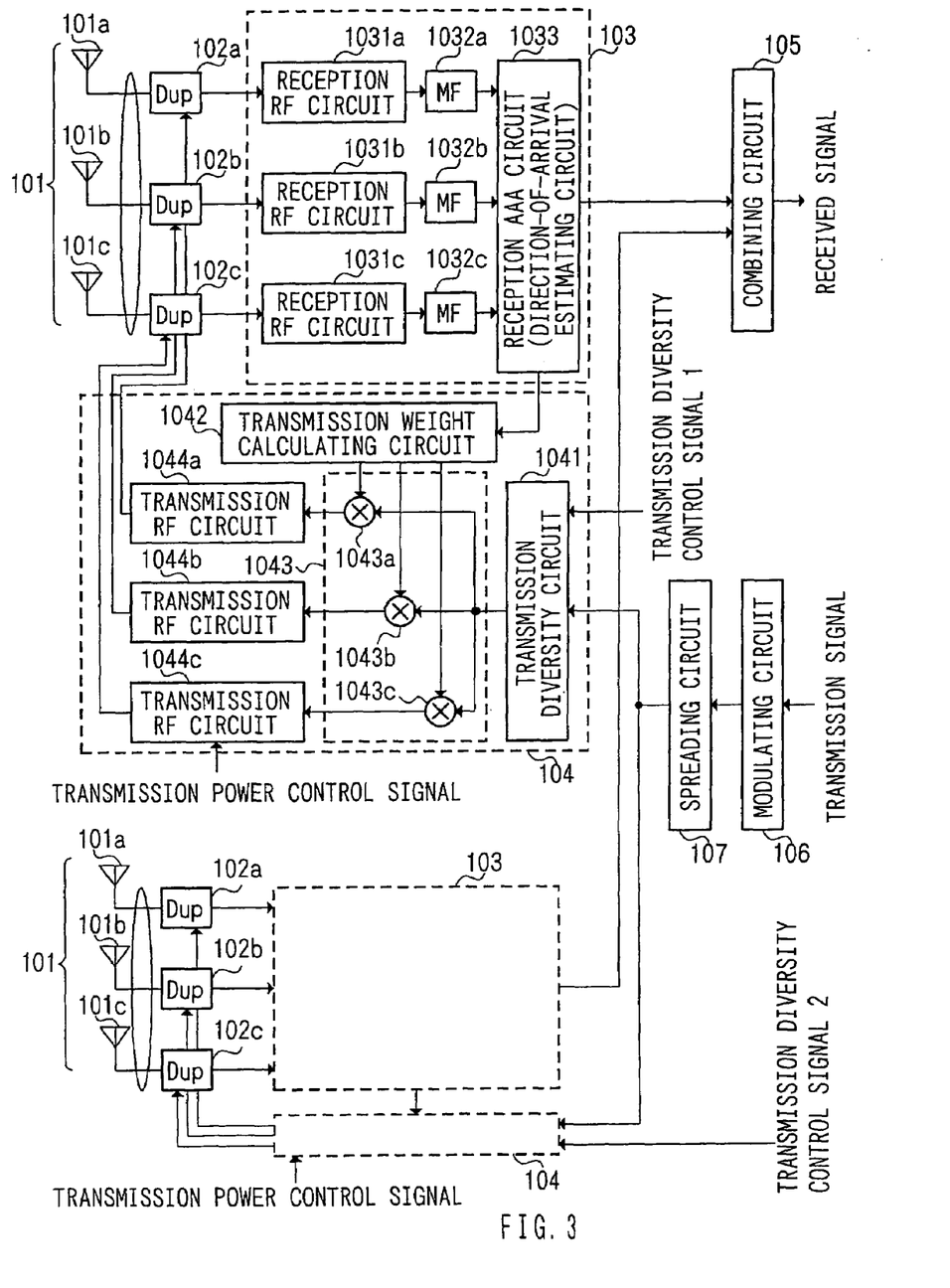
FIG. 3 is a block diagram illustrating a configuration of a radio base station apparatus according to a first embodiment of the present invention.

FIG. 3 is a block diagram illustrating a configuration of a radio base station apparatus according to the first embodiment of the present invention. The radio base station apparatus has two diversity antennas 101 spaced apart from each other by a distance enabling space diversity, and two processing sequences each having receiver 103 and transmitter 104 provided for a corresponding diversity antenna 101. The switching between transmission and reception for the transmitter and receiver is performed by duplexers 102a to 102c. In addition, in the case of the TDD system, the switching between transmission and reception for the transmitter and receiver is performed by switches, instead of the duplexers.

In an actual communication, since a plurality of channels are multiplexed, a dividing section that divides a received signal for each channel is provided on an output side of a reception RF circuit on a receiver side, while a multiplexing section that multiplexes a plurality of channel transmission signals is provided on an input side of a transmission RF circuit. However, to simplify the explanation, FIG. 3 illustrates the configuration for one channel with the dividing section and multiplexing section omitted.

Signals transmitted from a communication terminal apparatus are received at diversity antenna 101 comprised of a plurality of (three in FIG. 3) antenna elements 101a to 101c, and output to reception RF circuits 1031a to 1031c through duplexers (Dup) 102a to 102c, respectively. Reception RF circuits 1031a to 1031c perform predetermined radio reception processing (downconverting, A/D conversion, etc.) to respective received signals. In the actual communication, the received signal subjected to the radio reception processing is divided into channel signals.

The received signals subjected to the radio reception processing are respectively output to matched filters (MF) 1032a to 1032c, and are despread using respective spreading codes used in spreading the transmission data on the communication terminal apparatus side. Thus despread signals are output to a reception adaptive array antenna (AAA) (direction-of-arrival estimating circuit) 1033.

Reception AAA circuit 1033 (or direction-of-arrival estimating circuit) 1033 performs reception AAA processing or direction-of-arrival estimating processing. These kinds of processing will be described later. Thus processed signal is output to combining circuit 105 for each diversity antenna, combined in combining circuit 105, and obtained as a received signal. Weight information and angle information on the direction of arrival obtained in the reception AAA processing or direction-of-arrival estimating processing is output to transmission weight calculating circuit 1042 in transmitter 104.

Meanwhile, a transmission signal is output to modulating circuit 106 and subjected to digital modulation processing therein. The modulated signal is output to spreading circuit 107 and spread with a predetermined spreading code. At this point, two processing sequences use the same spreading code. The spread signal (transmission signal) is output to transmission weight multiplying section 1043 through transmit diversity circuit 1041 of each transmitter 1045. Transmit diversity circuit 1041 performs transmit diversity processing according to transmit diversity control signals 1 and 2.

Transmission weight multiplying section 1043 multiplies the transmission signal by a respective transmission weight calculated in transmission weight calculating circuit 1042, in each of multipliers 1043a to 1043c provided for corresponding antennas. The transmission signals each multiplied by the transmission weight are output to respective transmission RF circuits 1044a to 1044c, and therein, subjected to predetermined radio transmission processing (D/A conversion, upconverting, etc.). At this point, transmission RF circuits 1044a to 1044c have an input control signal for closed-loop and/or open-loop transmit power control, and according to the transmit power control signal, control the transmit power. In the actual communication, the transmission signal multiplied by the transmission weight undergoes the transmit power control, and then transmission signals of a plurality of channels are multiplexed. The multiplexed signal undergoes the radio transmission processing. The transmission signals subjected to the radio transmission processing are output to duplexers 102a to 102c, and then transmitted from antenna elements 101a to 101c to a communication terminal apparatus, respectively.

The operation of the radio base station apparatus with the above configuration will be described below.

Signals received from diversity antenna 101 are subjected to radio reception processing in reception RF circuits 1031a to 1031b for respective antenna elements 101a to 101c, then despread in matched filters 1032a to 1032c, respectively, and output to reception AAA circuit (or direction-of-arrival estimating circuit) 1033.

Reception AAA circuit (or direction-of-arrival estimating circuit) 1033 obtains weights and directions of arrival for forming an optimal reception radiation pattern, using uplink signals received in respective antenna elements. The weight information and direction-of-arrival information (angle of arrival) is output to transmission weight calculating circuit 1042, which calculates transmission weights. There are various method as described below for obtaining a weight of reception directivity and direction-of-arrival information from a received signal to calculate a transmission weight.

A first one is such a method that obtains a reception weight in reception AAA processing in reception AAA circuit (or direction-of-arrival estimating circuit) 1033, and using the weight, calculates a transmission weight. For example, there is a method for obtaining the reception weight using beam steering. In addition, the reception AAA processing is described in IEICE TRANS. COMMUN., VOL. E77-B. NO. 5 MAY 1994 "Spectral Efficiency Improvement by Base Station Antenna Pattern Control for Land Mobile Cellular systems", entire content of which is expressly incorporated by reference herein.

In this method, as illustrated in FIG. 3, in the FDD system, since different frequencies are used between transmission and reception, when the weight obtained in the reception AAA processing is used to calculate a transmission weight, a different radio pattern is obtained at the time of transmission. Therefore, transmission weight calculating circuit 1042 performs regeneration of weights using reception weights obtained in the reception AAA processing. The weight regeneration method is described in also in IEICE TRANS. COMMUN., VOL. E77-B. NO. 5 MAY 1994 "Spectral Efficiency Improvement by Base Station Antenna Pattern Control for Land Mobile Cellular systems", entire content of which is expressly incorporated by reference herein.

In this method, in the TDD system, since the same frequency is used in transmission and reception, transmission weight calculating circuit 1042 calculates transmission weights using the weights themselves obtained in the reception AAA processing.

A second one is such a method that obtains a reception weight in the reception AAA processing in reception AAA circuit (or direction-of-arrival estimating circuit) 1033, estimates a direction of arrival of an uplink signal from the reception weight, and calculates a transmission weight using the estimated value. In the reception AAA processing, a null direction is set by null steering, and therefore the direction of arrival is not obtained necessarily. Accordingly, using the reception weight obtained in the reception AAA processing, a beam direction with the maximum power of a desired signal is detected, and the direction of arrival is estimated from candidate directions of arrival.

After the direction of arrival is thus estimated, the estimated value (angle information) is output to transmission weight calculating circuit 1042, and according to the estimated value, the circuit 1042 calculates a transmission weight for pointing a beam. Samples of the method for calculating a transmission weight from the obtained estimated value is a method for preparing in advance a table relating an estimated value to a transmission weight and referring to the table after obtaining the estimated value to obtain a transmission weight, and another method for performing beam forming using the obtained estimated value and adaptively obtaining a transmission weight.

A third one is such a method that estimates a direction of arrival of an uplink signal without using a reception weight, and calculates a transmission weight using the estimated value. The method for estimating a direction of arrival of an uplink signal is not limited to a particular one. For example, either method would be used that is described in "Design•Analysis Method Workshop in Antenna•Propagation (No. 10)—Adaptive Signal Processing Technique by Array Antenna and High-Resolution Direction of Arrival Estimation Introduction Course—Oct. 30, 1997".

After the direction of arrival is thus estimated, the estimated value (angle information) is output to transmission weight calculating circuit 1042, and according to the estimated value, the circuit 1042 calculates a transmission weight for pointing a beam. Samples of the method for calculating a transmission weight from the obtained estimated value are, as in the second method, a method for preparing in advance a table relating an estimated value to a transmission weight and referring to the table after obtaining the estimated value to obtain a transmission weight, and another method for performing beam forming using the obtained estimated value and adaptively obtaining a transmission weight.

Meanwhile, a transmission signal is subjected to digital modulation processing in modulating circuit 106, is spread with a predetermined spreading code (the same code for two diversity antennas) in spreading circuit 107 in spreading circuit 107, and is output through transmit diversity circuit 1041 to multipliers 1043a to 1043c in transmission weight multiplying section 1043.

Transmit diversity circuit 1041 performs transmit diversity using transmit diversity control signals 1 and 2. Specifically, transmit diversity circuit 1041 multiplies the spread transmission signal by a weight indicated by each of transmit diversity control signals 1 and 2.

The weight indicated by each of transmit diversity control signals 1 and 2 is of a phase offset, or phase and power offsets in the closed-loop mode. As the closed loop mode, there are two modes, i.e., a mode for using a phase offset as the transmit diversity control signal, and another mode for using a phase offset and power offset as the transmit diversity control signal. This embodiment is capable of being applied to both closed-loop modes, in other words, to both case of using a phase offset as the transmit diversity control signal, and of using a phase offset and power offset as the transmit diversity control signal.

In the closed-loop mode, a radio base station apparatus provides antennas (in this case, two diversity antennas each comprised of a plurality of antenna elements) with different phase rotations (for example, 90° shit) or different power offsets (for example, 8:2 or 2:8 in power ratio) to perform transmission. The control on the offset is determined by a communication terminal apparatus. In other words, the communication terminal apparatus determines, using signals transmitted from both antennas, an extent of a phase difference between both signals, or extents of a phase difference and power difference therebetween, and transmits the control information to the radio base station apparatus, and according to the control information, the radio base station apparatus performs transmission.

The transmission signal with the offset provided in transmit diversity circuit 1041 is multiplied by a transmission weight in each of multipliers 1043a to 1043c in transmission weight multiplying section 1043. The transmission weight is calculated in transmission weight calculating circuit 1042, as described above, based on the weight information and angle information obtained in the reception AAA circuit and the direction-of-arrival estimating circuit. The transmission signals each thus multiplied by the transmission weight are subjected to predetermined radio transmission processing in respective transmission RF circuits 1044a to 1044c, and then are transmitted in beam forming state to a communication terminal apparatus. In this case, parallel diversity transmission is performed using two diversity antennas 101 spaced apart from each other by a distance enabling space diversity.

In addition, in the case other than a case of the closed-loop mode, a spread transmission signal is multiplied by the above-mentioned transmission weight in each of multipliers 1043a to 1043c in transmission weight multiplying section 1043.

The radio base station apparatus according to this embodiment is capable, on communication channels and control channels for specific users, of suppressing fading by the space diversity effect and of exhibiting the interfering suppressing effect due to the narrowed spatial directivity. Accordingly, the apparatus is capable of improving communication qualities by suppressing the fading, of performing efficient communications with each communication terminal apparatus, and thereby of decreasing effects on other terminal apparatuses to increase the system capacity. Further, since the communication qualities are improved, it is not necessary to increase a control amount in the transmit power control, nor to shorten a control cycle. Furthermore, the present invention is effective in shadowing due to the space diversity effect. Since the spatial directivity is narrowed, the apparatus of the present invention is capable of communicating efficiently and of decreasing the transmit power.

In the configuration illustrated in FIG. 3, a spread transmission signal is multiplied by a phase offset in the closed-loop mode, and is further multiplied by a transmission weight. The multiplication of the phase offset and of transmission weight may be performed together in a same processing section. In other words, a configuration may be possible in which one multiplying section multiplies a spread transmission signal by a phase offset and by a transmission weight. It is thereby possible to cope with the closed-loop mode without modifying the hardware scale (without increasing the number of multipliers), when the closed-loop mode is applied.

Second Embodiment

This embodiment describes a case that STTD (Space Time Transmit Diversity) that is an example of the open-loop mode is applied. Also in this case, the present invention is capable of being applied to both the FDD (Frequency Division Duplex) system and TDD (Time Division Duplex) system. A case will be described that a radio transmission method of the present invention is applied only to a communication channel (including packets) and a control channel for a specific user (FACH and AICH).

Figure 4:
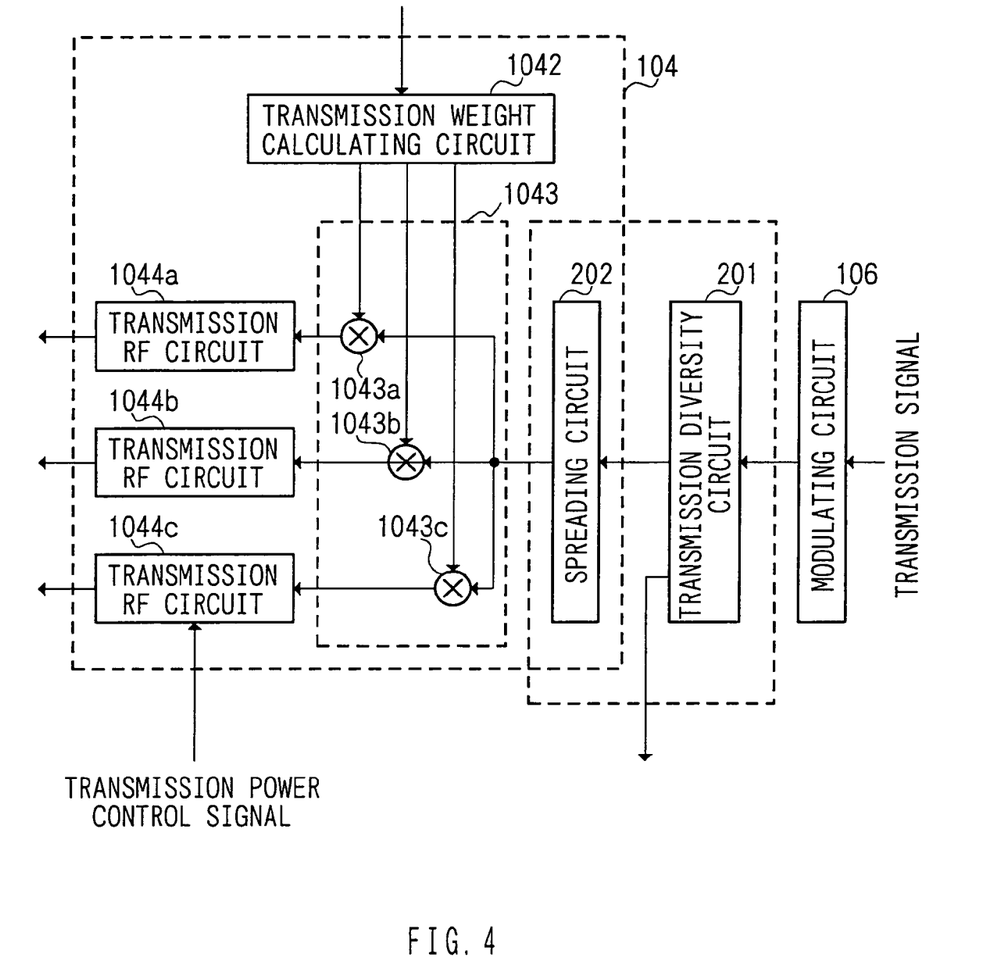
FIG. 4 is a block diagram illustrating part of a configuration of a radio base station apparatus according to a second embodiment of the present invention.

FIG. 4 is a block diagram illustrating part of a configuration of a radio base station apparatus according to a second embodiment of the present invention. In FIG. 4, the same sections as in the FIG. 3 are assigned the same reference numerals as in FIG. 3 to omit detailed explanations thereof.

The radio base communication apparatus is provided on a transmitter side with modulating circuit 106 that performs digital modulation processing on a transmission signal, transmit diversity circuit 201 that performs transmit diversity processing on the modulate transmission signal, spreading circuit 202 that spreads the transmission signal subjected to the transmit diversity processing, transmission weight multiplying circuit 1043 that multiplies the spread transmission signal by a transmission weight calculated in transmission weight calculating circuit 1042, and transmission RF circuits 1044a to 1044c that perform predetermined transmission processing on respective transmission signals each multiplied by the transmission weight.

The operation of the radio base station apparatus with the above configuration will be described below.

The apparatus operates in the same way as in the first embodiment until the apparatus acquires reception weight information or direction-of-arrival information using an uplink signal from a communication terminal apparatus, and calculates a transmission weight in transmission weight calculating circuit 1042 from the reception weight or direction-of-arrival information.

Meanwhile, a transmission signal is output to modulating circuit, and is subjected to digital modulation processing. The digital modulated signal is output to transmit diversity circuit 201. Transmit diversity circuit 201 performs transmit diversity calculation (STTD encode) on the digital modulated transmission signal. In the STTD encode, as signals to be transmitted from another transmission antenna at the same time as every successive two symbols (S1, S2), the calculation is performed to obtain (−S2*, S1*). "*" indicates complex conjugate.

The transmission signal subjected to the transmit diversity calculation is output to spreading circuit 202. Spreading circuit 202 spreads the transmission signal with a predetermined spreading code (the same spreading code for two diversity antennas).

The spread transmission signal is multiplied by a transmission weight in each of multipliers 1043a to 1043c in transmission weight multiplying section 1043. The transmission weight is calculated in transmission weight calculating circuit 1042, as explained in the first embodiment, based on the weight information and angle information obtained in the reception AAA circuit and the direction-of-arrival estimating circuit. The transmission signals each thus multiplied by the transmission weight are subjected to predetermined radio transmission processing in respective transmission RF circuits 1044a to 1044c, and then are transmitted in beam forming state to a communication terminal apparatus. In this case, parallel diversity transmission is performed using two diversity antennas 101 spaced apart from each other by a distance enabling space diversity.

The radio base station apparatus according to the this embodiment is capable, on communication channels and control channels for specific users, of suppressing fading by the space diversity effect, and further of exhibiting the interfering suppressing effect due to the narrowed spatial directivity. Accordingly, the apparatus is capable of improving communication qualities by suppressing the fading, of performing efficient communications with each communication terminal apparatus, and thereby of decreasing effects on other terminal apparatuses to increase the system capacity. Further, since the communication qualities are improved, it is not necessary to increase a control amount in the transmit power control, nor to shorten a control cycle. Furthermore, the present invention is effective in shadowing due to the space diversity effect. Since the spatial directivity is narrowed, the apparatus of the present invention is capable of communicating efficiently and of decreasing the transmit power.

In addition, in the open-loop mode, since a communication terminal apparatus does not need to transmit a control signal to a radio base station apparatus, the control can be simplified between the communication terminal apparatus and radio base station apparatus.

The present invention is not limited to the above-mentioned embodiments, and is capable of being carried into practice with various modifications thereof. For example, in the above-mentioned first to second embodiments, a case is described that a receiver of the radio base station apparatus receives signals using an adaptive array antenna, however, the present invention is capable of being applied similarly also to a case that the receiver does not use an adaptive array antenna in receiving signals. Further, in the above-mentioned first to second embodiments, a case is described that transmission and reception on uplink and downlink are performed in the FDD system, however, the present invention is capable of being applied similarity also to a case where transmission and reception on uplink and downlink are performed in the TDD system.

A radio base station apparatus of the present invention comprises two diversity antennas, each comprised of a plurality of antenna elements, spaced apart from each other by a distance enabling space diversity, and transmitters provided for each of the two diversity antennas, where each of the transmitters have a calculating section that calculates a transmission weight from a reception weight or an angle of a direction of arrival obtained by using an uplink signal, and a multiplying section that multiplies a transmission signal spread with a predetermined spreading code by the transmission weight.

According to this configuration, on communication channels and control channels for specific users, it is possible to suppress fading by the space diversity effect, and to exhibit the interfering suppressing effect due to the narrowed spatial directivity. Accordingly, the apparatus is capable of improving communication qualities by suppressing the fading, of performing efficient communications with each communication terminal apparatus, and thereby of decreasing effects on other terminal apparatuses to increase the system capacity. Further, since the communication qualities are improved, it is not necessary to increase a control amount in the transmit power control, nor to shorten a control cycle. Furthermore, the present invention is effective in shadowing due to the space diversity effect. Since the spatial directivity is narrowed, the apparatus of the present invention is capable of communicating efficiently and of decreasing the transmit power.

In the radio base station apparatus of the present invention with the above configuration, each of the transmitters further have an offset providing section that provides a transmission signal with a phase offset, or a phase offset and a power offset.

According to this configuration, also in the closed-loop mode, on communication channels and control channels for specific users, it is possible to suppress fading by the space diversity effect, and to exhibit the interfering suppressing effect due to the narrowed spatial directivity.

In the radio base station apparatus of the present invention with the above configuration, the multiplying section operates as the offset providing section.

According to this configuration, even when the closed-loop mode is applied as transmit diversity, it is possible to cope with the closed-loop mode without modifying the hardware scale (without increasing the number of multipliers).

In the radio base station apparatus of the present invention with the above configuration, each of the transmitters further have a calculating section that performs transmit diversity calculation on a transmission signal to be subjected to spreading.

According to this configuration, by the transmit diversity in the open-loop mode, on communication channels and control channels for specific users, it is possible to suppress fading by the space diversity effect, and to exhibit the interfering suppressing effect due to the narrowed spatial directivity.

A communication terminal apparatus of the present invention has a feature of performing a radio communication with the above-mentioned radio base station apparatus. It is thereby possible on communication channels to suppress fading by the space diversity effect, to exhibit the interfering suppressing effect due to the narrowed spatial directivity, and to perform more efficient radio communications.

A radio transmission method of the present invention comprises the steps of calculating a transmission weight from a reception weight or an angle of a direction of arrival obtained by using an uplink signal, providing a transmission signal spread with a predetermined spreading code with a phase offset, or a phase offset and a power offset, multiplying the transmission signal provided with the phase offset by the transmission weight, and transmitting the transmission signal multiplied by the transmission weight from two diversity antennas, each comprised of a plurality of antenna elements, spaced apart from each other by a distance enabling space diversity.

According to this method, in the closed-loop mode, on communication channels and control channels for specific users, it is possible to suppress fading by the space diversity effect, and to exhibit the interfering suppressing effect due to the narrowed spatial directivity.

A radio transmission method of the present invention comprises the steps of calculating a transmission weight from a reception weight or an angle of a direction of arrival obtained by using an uplink signal, performing transmit diversity calculation on a transmission signal, spreading the transmission signal subjected to the transmit diversity calculation with a predetermined spreading code, multiplying the spread transmission signal by the transmission weight, and transmitting the transmission signal multiplied by the transmission weight from two diversity antennas, each comprised of a plurality of antenna elements, spaced apart from each other by a distance enabling space diversity.

According to this method, in the open-loop mode, on communication channels and control channels for specific users, it is possible to suppress fading by the space diversity effect, and to exhibit the interfering suppressing effect due to the narrowed spatial directivity.

As described above, according to the present invention, it is possible, on communication channels and control channels for specific users, to suppress fading by the space diversity effect and to exhibit the interfering suppressing effect due to the narrowed spatial directivity.

This application is based on the Japanese Patent Application No. HEI11-287896 filed on Oct. 8, 1999, entire content of which is expressly incorporated by reference herein.

INDUSTRIAL APPLICABILITY

The present invention is capable of being applied to a digital radio communication system, and more particularly to a radio base station apparatus and radio transmission method used in DS-CDMA.

What is claimed is:

1. A radio base station apparatus comprising:
two diversity antennas spaced apart by a distance that allows space diversity, each diversity antenna functioning as an adaptive array antenna; and
transmitters provided respectively corresponding to the two diversity antennas, each transmitter comprising:
a calculator that calculates a transmission weight from one of (i) a reception weight determined based on an uplink signal and (ii) direction of arrival information;
a multiplier that multiplies only a transmission signal for a channel to a specific user by the transmission weight; and
a transmit power controller that controls a transmit power of the transmission signal multiplied by the transmission weight in accordance with a transmit power control signal.

2. The radio base station apparatus of claim 1, wherein said each transmitter further comprises:
a spreader that spreads the transmission signal using a predetermined spreading code; and
a transmit diversity circuit that performs a transmission diversity calculation of the transmission signal spread in the spreader and provides one of (i) a phase offset and (ii) a phase offset and a power offset, to the transmission signal after spreading, wherein:
the multiplier multiplies the transmission signal after the transmission diversity calculation by the transmission weight.

3. The radio base station apparatus of claim 2, wherein said each transmitter further comprises:
a spreader that spreads the transmission signal using a predetermined spreading code, wherein:
the multiplier multiples the transmission signal spread in the spreader by one of (i) the transmission weight and a phase offset and (ii) the transmission weight, a phase offset and a power offset.

4. The radio base station apparatus of claim 1, wherein said each transmitter further comprises:
a transmit diversity circuit that performs a transmit diversity calculation of the transmission signal; and
a spreader that spreads the transmission signal after the transmit diversity calculation in the transmit diversity circuit, wherein:
the multiplier multiplies the transmission signal spread in the spreader by the transmission weight.

5. A radio transmission method comprising:
calculating a transmission weight from one of (i) a reception weight determined based on an uplink signal and (ii) direction of arrival information;
multiplying only a transmission signal for a channel to a specific user by the transmission weight;
controlling a transmit power of the transmission signal multiplied by the transmission weight in accordance with a transmit power control signal; and
transmitting the transmission signal subjected to transmit power control from two diversity antennas spaced apart by a distance that allows space diversity, each diversity antenna functioning as an adaptive array antenna.

6. The radio transmission method of claim 5, comprising:
spreading the transmission signal using a predetermined spreading code;
performing a transmit diversity calculation of the transmission signal after spreading and providing one of (i) a phase offset and (ii) a phase offset and a power offset, to said transmission signal after spreading; and
multiplying the transmission signal after the transmit diversity calculation by the transmission weight.

7. The radio transmission method of claim 5, comprising:
performing a transmit diversity calculation of the transmission signal; and
spreading the transmission signal after the transmission diversity calculation, wherein:
the transmission signal after spreading is multiplied by the transmission weight.

* * * * *